(12) United States Patent
Lu et al.

(10) Patent No.: US 11,927,325 B1
(45) Date of Patent: Mar. 12, 2024

(54) LINEAR LAMP HAVING SPLICING MEMBER

(71) Applicant: Xiamen PVTECH Co., Ltd., Fujian (CN)

(72) Inventors: Fuxing Lu, Fujian (CN); Sishan Liao, Fujian (CN)

(73) Assignee: Xiamen PVTECH Co., Ltd., Fujian (CN)

(*) Notice: Subject to any disclaimer, the term of this patent is extended or adjusted under 35 U.S.C. 154(b) by 0 days.

(21) Appl. No.: 18/215,833

(22) Filed: Jun. 29, 2023

(30) Foreign Application Priority Data

Jan. 16, 2023 (CN) .......................... 202310075298.1

(51) Int. Cl.
| | |
|---|---|
| F21V 17/16 | (2006.01) |
| F21S 2/00 | (2016.01) |
| F21S 4/28 | (2016.01) |
| F21S 8/06 | (2006.01) |
| F21V 21/005 | (2006.01) |
| F21V 33/00 | (2006.01) |
| F21Y 103/10 | (2016.01) |

(52) U.S. Cl.
CPC ............ *F21V 17/164* (2013.01); *F21S 2/005* (2013.01); *F21S 4/28* (2016.01); *F21V 21/005* (2013.01); *F21V 33/0052* (2013.01); *F21V 33/0076* (2013.01); *F21S 8/061* (2013.01); *F21Y 2103/10* (2016.08)

(58) Field of Classification Search
CPC ...... F21V 21/005; F21V 17/164; F21V 17/18; F21S 2/00; F21S 2/005; F21S 4/28
See application file for complete search history.

(56) References Cited

U.S. PATENT DOCUMENTS

| | | | |
|---|---|---|---|
| 2012/0092875 A1* | 4/2012 | Cho ......................... | F21S 4/28 362/362 |
| 2014/0043802 A1* | 2/2014 | Dings ................. | F21V 23/0478 362/221 |
| 2014/0071668 A1* | 3/2014 | Ai ............................. | F21S 8/00 362/217.17 |
| 2016/0356470 A1* | 12/2016 | Noh ......................... | F21V 29/74 |
| 2021/0270452 A1* | 9/2021 | Wu ....................... | F21V 15/015 |
| 2022/0107062 A1* | 4/2022 | Monsonego .......... | F21V 21/005 |
| 2022/0214032 A1* | 7/2022 | Ju ......................... | G02B 6/0088 |
| 2022/0373146 A1* | 11/2022 | Li ......................... | F21V 17/164 |
| 2023/0151935 A1* | 5/2023 | Krotmeier ............... | F21S 8/026 362/217.01 |

* cited by examiner

*Primary Examiner* — William N Harris
(74) *Attorney, Agent, or Firm* — Winston Hsu

(57) ABSTRACT

A linear lamp having splicing member includes a lamp body, an extension module and a splicing member. The splicing member has two fixing portions disposed at the two ends thereof respectively. The two fixing portions of the extension module are engaged with the first combining member of the lamp body and the second combining member respectively in order to splice the extension module and the lamp body with each other. Via the above structure, the functional extension of the linear lamp can be realized by linear splicing mechanism, such that various extension functions can be conveniently and efficiently added to the linear lamp regardless of the environment.

6 Claims, 8 Drawing Sheets

LINEAR LAMP HAVING SPLICING MEMBER

BACKGROUND OF THE INVENTION

1. Field of the Invention

The present invention relates to a linear lamp, in particular to a linear lamp having splicing member.

2. Description of the Prior Art

There are two conventional solutions for adding extension functions to currently available linear lamps: 1. Adding an additional structure for fixing an extension function on the lamp body of a linear lamp; 2. Additionally adding an external extension function component to the lamp body of the linear lamp and the fixing structure for fixing the above component is not provide by the lamp body of the linear lamp. The first solution can only realize some extension functions that do not require much space, such as sensing, emergency, etc., while the extension functions that require more space (such as a camera) cannot be realized. The second solution tends to be influenced by the installation environment of the linear lamp. If the environment cannot provide a proper position for fixing the extension function module, the extension function will not be realized.

SUMMARY OF THE INVENTION

Therefore, it is a primary objective of the present invention to provide a linear lamp having splicing member capable of realizing a functional extension mechanism with comprehensive application and easy to realize. In this way, an extension module and a lamp body can be spliced with each other, so the user can easily add the extension module to the lamp body or replace the extension module by another one.

One embodiment of the present invention provides a linear lamp having splicing member, which includes a lamp body, an extension module and a splicing member. The lamp body has a first combining member disposed at one side thereof. The extension module is disposed on one side of the lamp body. One side of the extension module is provided with a second combining member. The splicing member has two fixing portions disposed at the two ends thereof respectively. The two fixing portions are engaged with the first combining member and the second combining member respectively in order to splice the extension module and the lamp body with each other.

In one embodiment of the present invention, the lamp body has a lamp housing disposed at the upper part thereof and a lamp cover disposed at the lower part thereof. The first combining member is disposed at the inner wall of the lamp housing.

In one embodiment of the present invention, the extension module has a fixing housing disposed at the upper part thereof and corresponding to the lamp housing. The second combining member is disposed on the inner wall of the fixing housing.

In one embodiment of the present invention, the two ends of the splicing member are disposed inside the lamp housing and the fixing housing respectively.

In one embodiment of the present invention, the lamp housing has a first position limiting slot and the fixing housing has a second position limiting slot. The two ends of the splicing member are engaged with the first position limiting slot and the second position limiting slot respectively.

In one embodiment of the present invention, the first combining member and the second combining member are spring sheets. The fixing portions are installation holes. The spring sheets are engaged with the installation holes respectively.

In one embodiment of the present invention, each of the spring sheets has a hook portion and a pressing portion disposed at the distal end of the hook portion. The hook portion is detachably engaged with the installation hole corresponding thereto and the pressing portion is exposed from the splicing member.

In one embodiment of the present invention, the extension module has a functional base connected to the fixing housing and having a hanging hook. The fixing housing has a hook arm and the hanging hook hangs on the hook arm.

In one embodiment of the present invention, the two sides of the fixing housing are provided with two inwardly extended protrusions respectively and two sides of the functional base are provided with two outwardly extended protrusions respectively. Each of the outwardly extended protrusions is detachably engaged with the inwardly extended protrusion corresponding thereto.

In one embodiment of the present invention, the extension module includes a camera and a sensing module.

To sum up, according to the linear lamp having splicing member of the embodiments of the present invention, the functional extension of the linear lamp can be realized by linear splicing mechanism, such that various extension functions can be conveniently and efficiently added to the linear lamp regardless of the environment. In addition, the appearance of the fixing housing of the extension module can match that of the upper half of the linear lamp, so the overall appearance of the linear lamp will not be influenced. Further, via the connection structure of the lamp body, the spring sheets of the extension module and the installation holes of the splicing member, the user can conveniently and efficiently install or replace the extension module by using the pressing portions of the spring sheets. Moreover, via the design of the hanging hook of the functional base of the extension module and the arm hook, the user can conveniently install or replace the functional base by hanging the functional base on the hook arm of the fixing housing in order to avoid that the functional base falls from the fixing housing.

Further scope of applicability of the present application will become more apparent from the detailed description given hereinafter. However, it should be understood that the detailed description and specific examples, while indicating exemplary embodiments of the present invention, are given by way of illustration only, since various changes and modifications within the spirit and scope of the present invention will become apparent to those skilled in the art from this detailed description.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The present invention will become more fully understood from the detailed description given herein below and the accompanying drawings which are given by way of illustration only, and thus are not limitative of the present invention and wherein.

DETAILED DESCRIPTION

The technical content of the present invention will become apparent by the detailed description of the following embodiments and the illustration of related drawings as follows.

Figure 1:
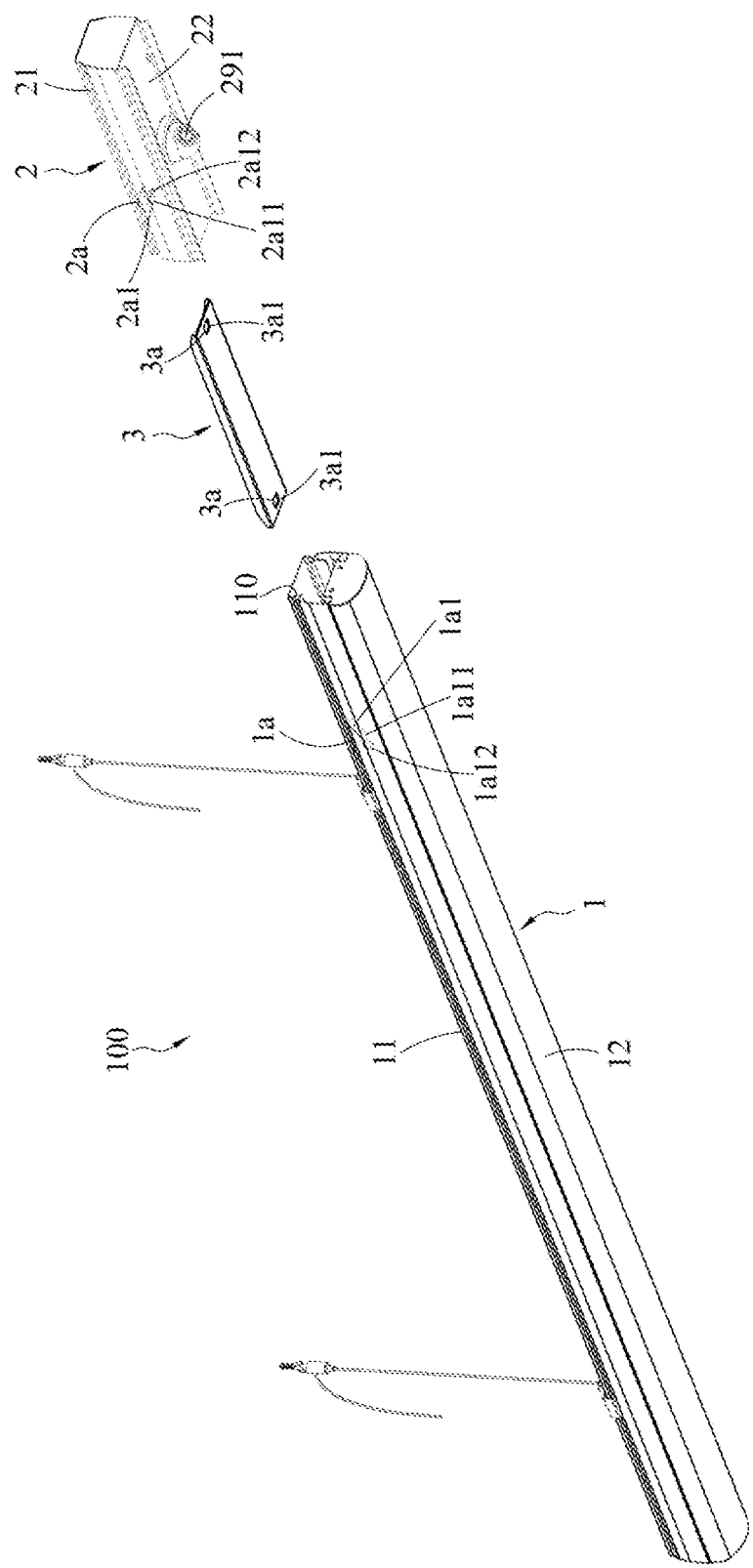
FIG. 1 is the exploded view of the linear lamp in accordance with one embodiment of the present invention. The first combining member of the lamp body and the second combining member of the extension module are shown by dotted lines.
Figure 2:
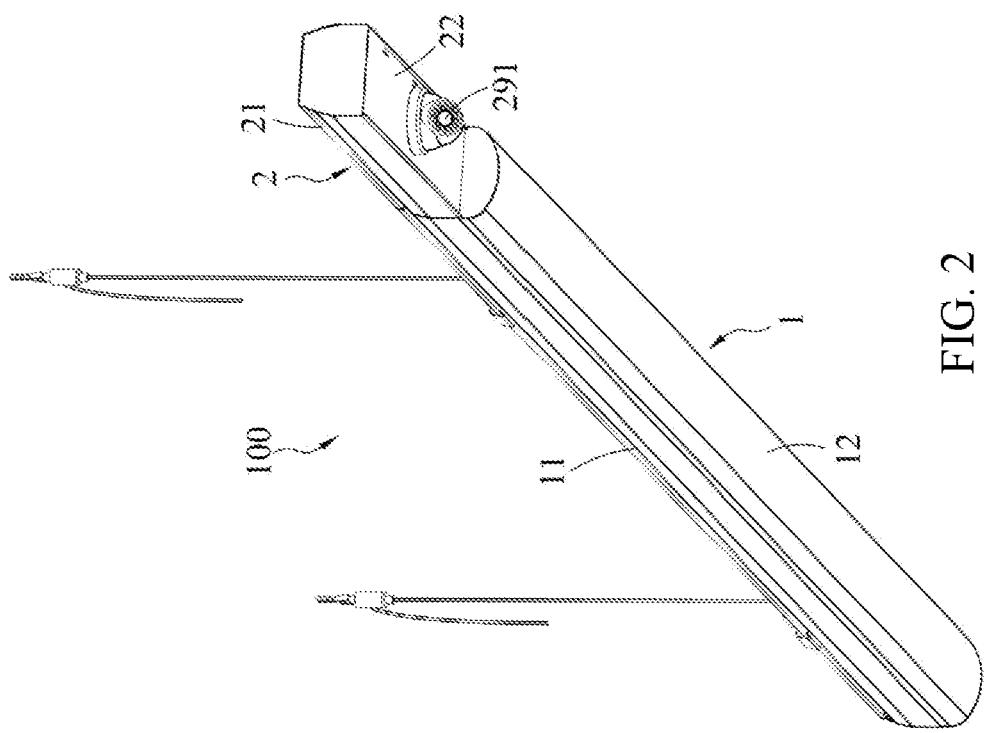
FIG. 2 is the perspective view of the linear lamp in accordance with one embodiment of the present invention.

Please refer to FIG. 1 and FIG. 2. FIG. 1 is an exploded view. The first combining member 1a of the lamp body 1 and the second combining member 2a of the extension module 2 are shown by dotted lines. FIG. 2 is a perspective view.

Figure 8:
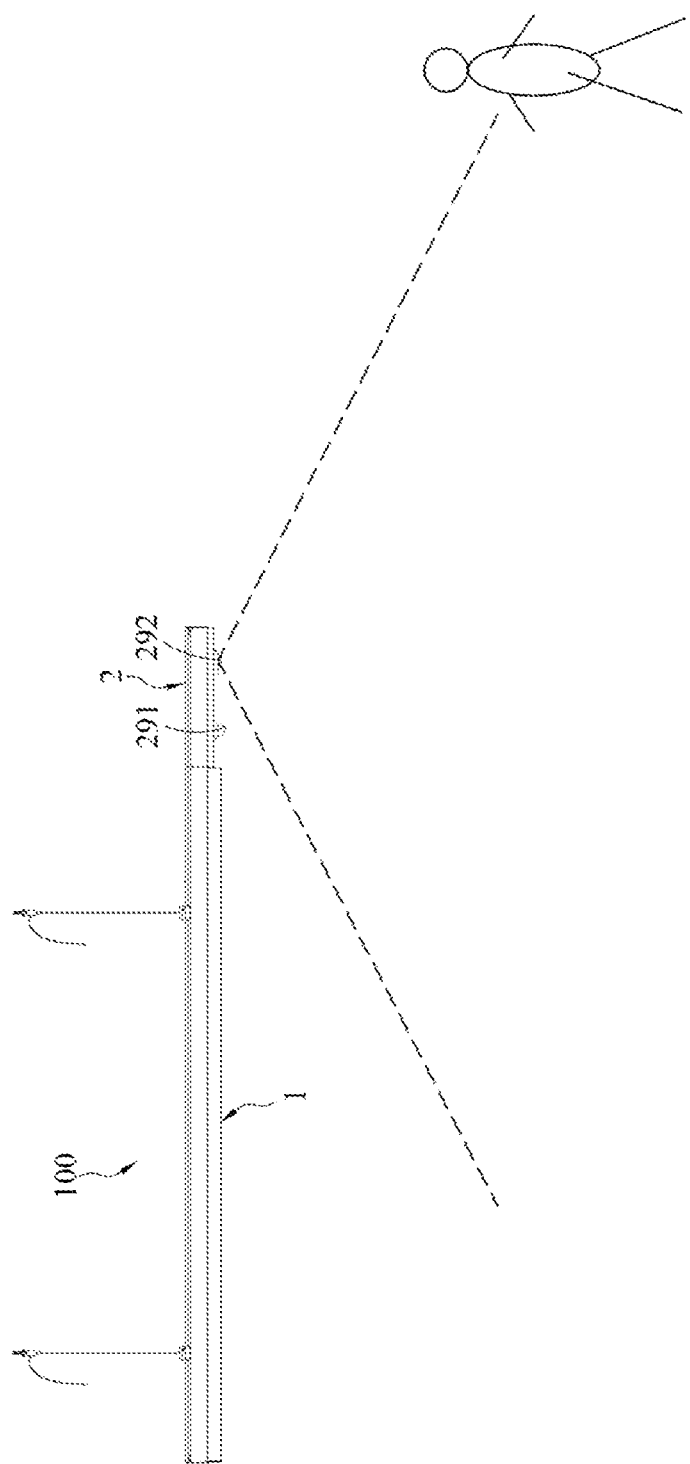
FIG. 8 is the side view of the linear lamp in accordance with one embodiment of the present invention, which shows the state that the sensing module of the extension module turns on the camera after detecting an object.

In some embodiments, the linear lamp 100 includes a lamp body 1, an extension module 2 and a splicing member 3. The extension module 2 includes, but not limited to, one or more of a camera 291, a sensing module 292 (e.g., an infrared sensor), a temperature sensor, a moisture sensor, a smoke sensor. The extension module 2 may be an external device or integrated with the linear lamp 100, which can be used to activate the lighting function or the image capturing function (as shown in FIG. 8) when detecting a person. The linear lamp 100 can provide multiple functions via the combination of the above modules.

Figure 3:
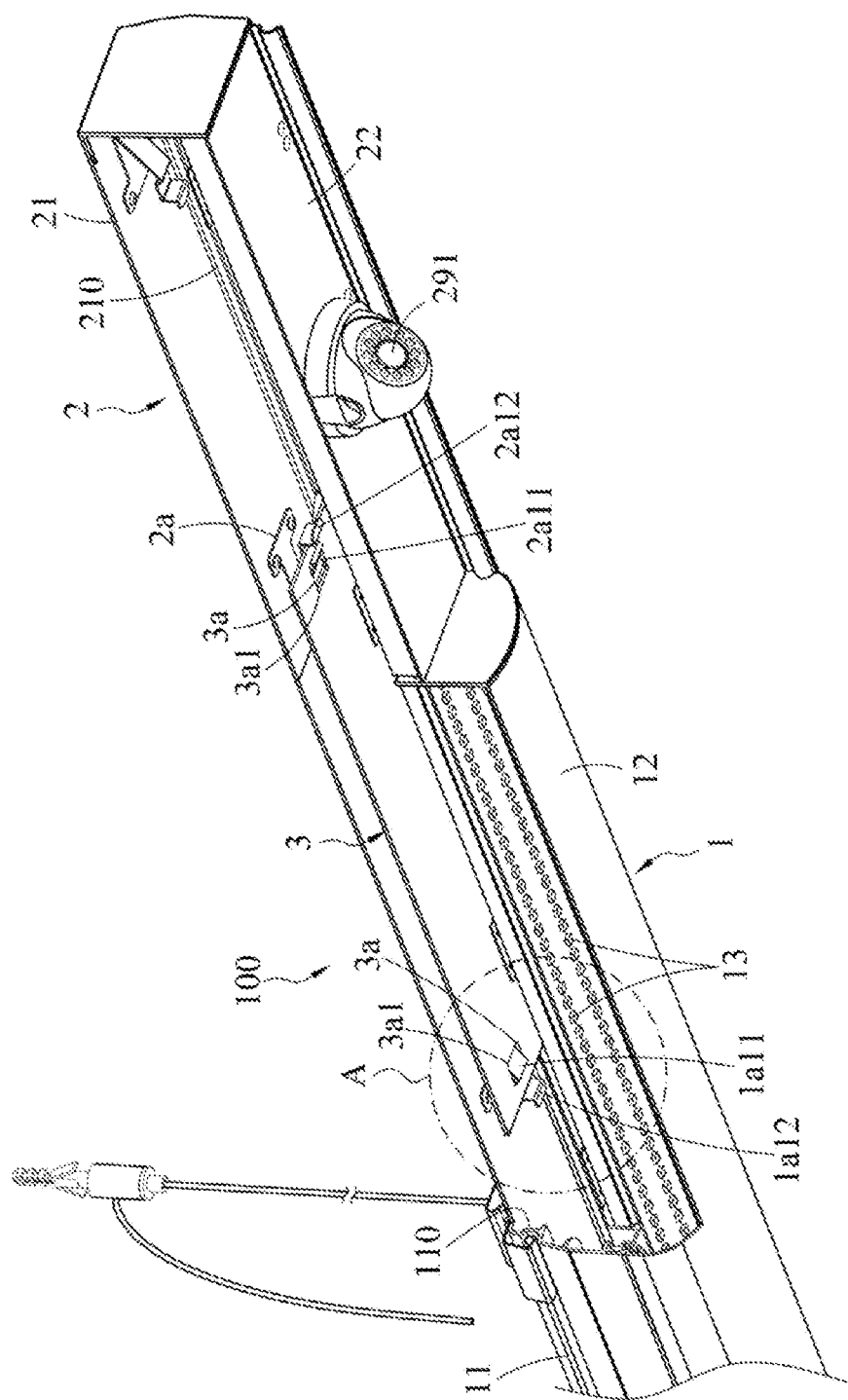
FIG. 3 is the sectional view of the partial structure of the linear lamp in accordance with one embodiment of the present invention.

Please refer to FIG. 3, which is a sectional view. In some embodiments, the lamp body 1 includes a long extruded-aluminum lamp housing 11, a lamp cover 12 and a light source 13. One side of the lamp body 1 is provided with a first combining member 1a.

Please refer to FIG. 3. In some embodiments, the extension module 2 is disposed on one side of the lamp body 1. One side of the extension module 2 is provided with a second combining member 2a.

Figure 4:
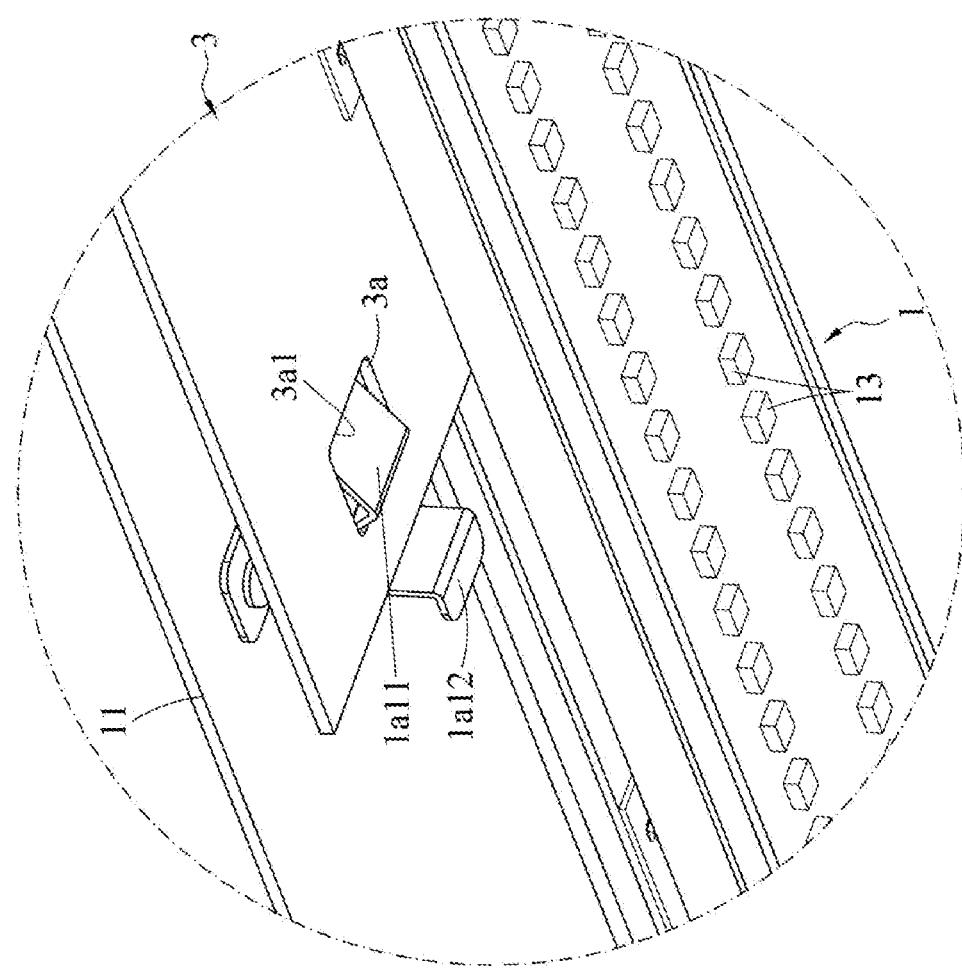
FIG. 4 is the enlargement view of the A portion of FIG. 3.

Please refer to FIG. 3 and FIG. 4. FIG. 4 is the enlargement view of the A portion of FIG. 3. In some embodiments, the splicing member 3 is a long flat plate. The splicing member 3 has two fixing portions 3a disposed at two ends thereof respectively. The two fixing portions 3a are engaged with the first combining member 1a and the second combining member 2a respectively in order to splice the extension module 2 and the lamp body 1 with each other. In some embodiments, the first combining member 1a is the spring sheet 1a1 and the second combining member 2a is the spring sheet 2a1, and the fixing portions 3a are installation holes 3a1. The spring sheet 1a1 and the spring sheet 2a1 are engaged with the installation holes 3a1 respectively. The function of the installation holes 3a1 can be exchanged with the function of the spring sheet 1a1 and the spring sheet 2a1.

In some embodiments, when the extension module 2 and the lamp body 1 are spliced with each other via the splicing member 3, the functions of the linear lamp 100 can be expanded, such that the functional extension of the linear lamp 100 can be conveniently realized by linear splicing mechanism, such that various extension functions can be conveniently and efficiently added to the linear lamp 100 regardless of the environment. In this way, the user can easily combine the extension module 2 with the lamp body 1 or replace the extension module 2 by another one by himself.

Please refer to FIG. 1 and FIG. 3. In some embodiments, the lamp body 1 has the lamp housing 11 disposed at the upper part thereof and the lamp cover 12 disposed at the lower part thereof. The first combining member 1a is disposed the inner wall of the lamp housing 11.

Please refer to FIG. 3 and FIG. 4. In some embodiments, the extension module 2 has a fixing housing 21 disposed at the upper part thereof and corresponding to the lamp housing 11. The second combining member 2a is disposed on the inner wall of the fixing housing 21. The appearance of the fixing housing 21 of the extension module 2 can match that of the upper half of the linear lamp 100, so the overall appearance of the linear lamp 100 will not be influenced.

Please refer to FIG. 3. In some embodiments, the two ends of the splicing member 3 are disposed inside the lamp housing 11 and the fixing housing 21 respectively, but the above structure is just for illustration instead of limitation. In some embodiments, the two ends of the splicing member 3 can be fixed on the outer surface of the lamp housing 11 and the outer surface of the fixing housing 21 respectively.

Please refer to FIG. 3. In some embodiments, the lamp housing 11 has a first position limiting slot 110 and the fixing housing 21 has a second position limiting slot 210. The two ends of the splicing member 3 are engaged with the first position limiting slot 110 and the second position limiting slot 210 respectively. In some embodiments, the cross section of the splicing member 3 is U-shaped, and the two side walls of the splicing member 3 are limited by and engaged with the first position limiting slot 110 and the second position limiting slot 210 respectively (as shown in FIG. 5).

Please refer to FIG. 3 and FIG. 4. In some embodiments, each of the spring sheets 1a1 has a hook portion 1a11 and a pressing portion 1a12 disposed at the distal end of the hook portion 1a11. Each of the hook portions 1a11 is detachably engaged with the installation hole 3a1 corresponding thereto and the pressing portion 1a12 is exposed from the splicing member 3. Each of the spring sheets 2a1 has a hook portion 2a11 and a pressing portion 2a12 disposed at the distal end of the hook portion 2a11. Each of the hook portions 2a11 is detachably engaged with the installation hole 3a1 corresponding thereto and the pressing portion 2a12 is exposed from the splicing member 3. The lamp body 1 and the extension module 2 are provided with the spring sheet 1a1, 2a1 at the positions corresponding to the splicing member 3. The splicing member 3 is also provided with the installation holes 3a1 corresponding to the above elements. When the user wants to use the linear lamp 100, the user can insert the splicing member 3 into the lamp body 1 and the extension module 2, and press the lamp body 1 and the extension module 2. Then, the splicing member 3 can be engaged with the spring sheets 1a1, 2a1. When the user wants to remove the splicing member 3, the user can press the pressing portions 1a12, 2a12 of the spring sheets 1a1, 2a1 in order to remove the splicing member 3 from the lamp body 1 and the extension module 2.

Figure 5:
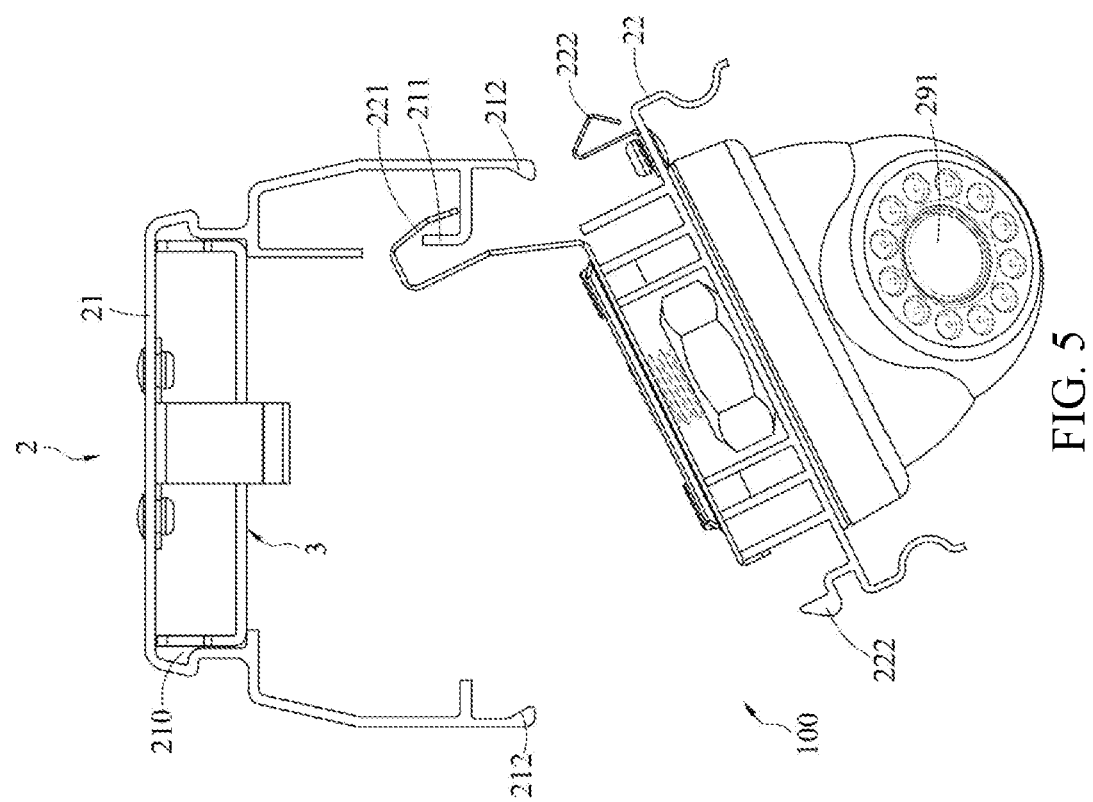
FIG. 5 is the first front sectional view of the linear lamp in accordance with one embodiment of the present invention, which shows that the hanging hook of the functional base hangs on the hook arm of the fixing housing.

Please refer to FIG. 5, which is a first front sectional view. FIG. 5 shows that the hanging hook 221 of the functional base 22 hangs on the hook arm 211 of the fixing housing 21. In some embodiments, the extension module 2 has a functional base 22 connected to the fixing housing 21. The fixing housing 21 has a hook arm 211. The hanging hook 221 hangs on and is engaged with the hook arm 211. The fixing housing 21 of the extension module 2 can be easily separated from the functional base 22 thereof. Thus, the user can conveniently replace the functional base 22 having the camera 291 and the sensing module 292 by another one.

In some embodiments, the functional base 22 has the hanging hook 221 extending toward a first direction and then extending toward a second direction reverse to the first direction. The fixing housing 21 has the L-shaped hook arm 211 corresponding to the hanging hook 221. The hanging hook 221 can facilitate the installation process. The user can hang the functional base 22 on the hook arm 211 of the fixing housing 21, and then the user can conveniently perform wiring. After the installation process is finished, the hanging hook 221 can avoid that the functional base 22 falls from the fixing housing 21. When the functional base 22 is separated from the fixing housing 21, the hanging hook 221 can hang on the hook arm 211, such that the functional base 22 will not fall from the fixing housing 21, which can prevent the user from being damaged.

Figure 6:
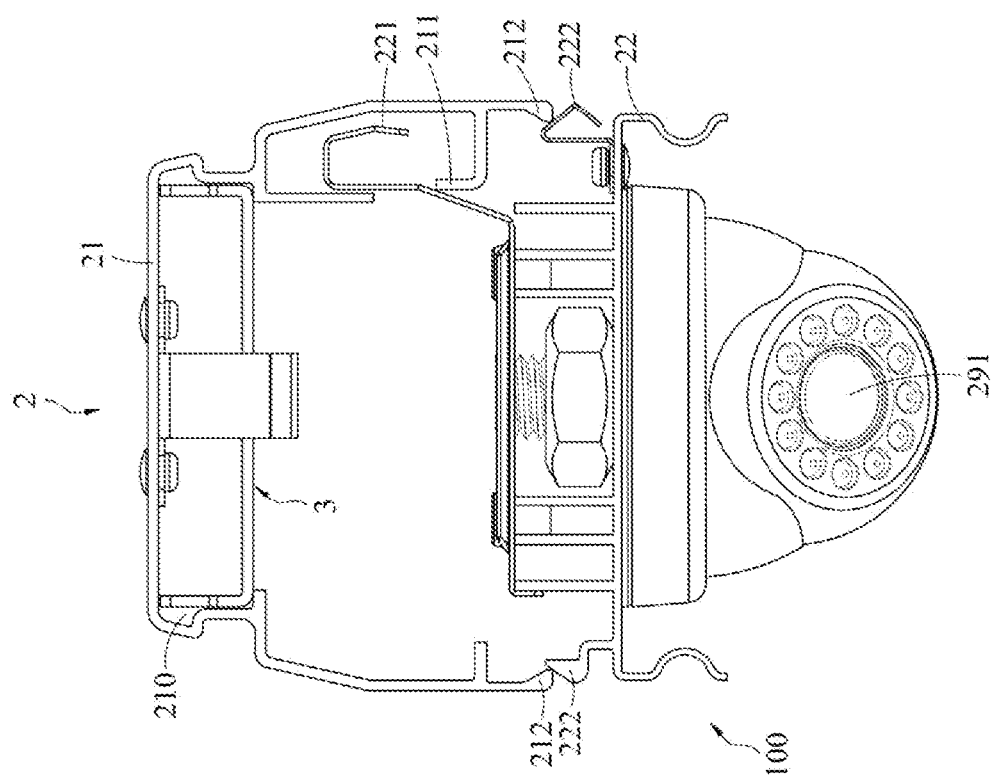
FIG. 6 is the second front sectional view of the linear lamp in accordance with one embodiment of the present invention, which shows the state that the inwardly extended protrusion of the fixing housing is not engaged with the outwardly extended protrusion of the functional base.
Figure 7:
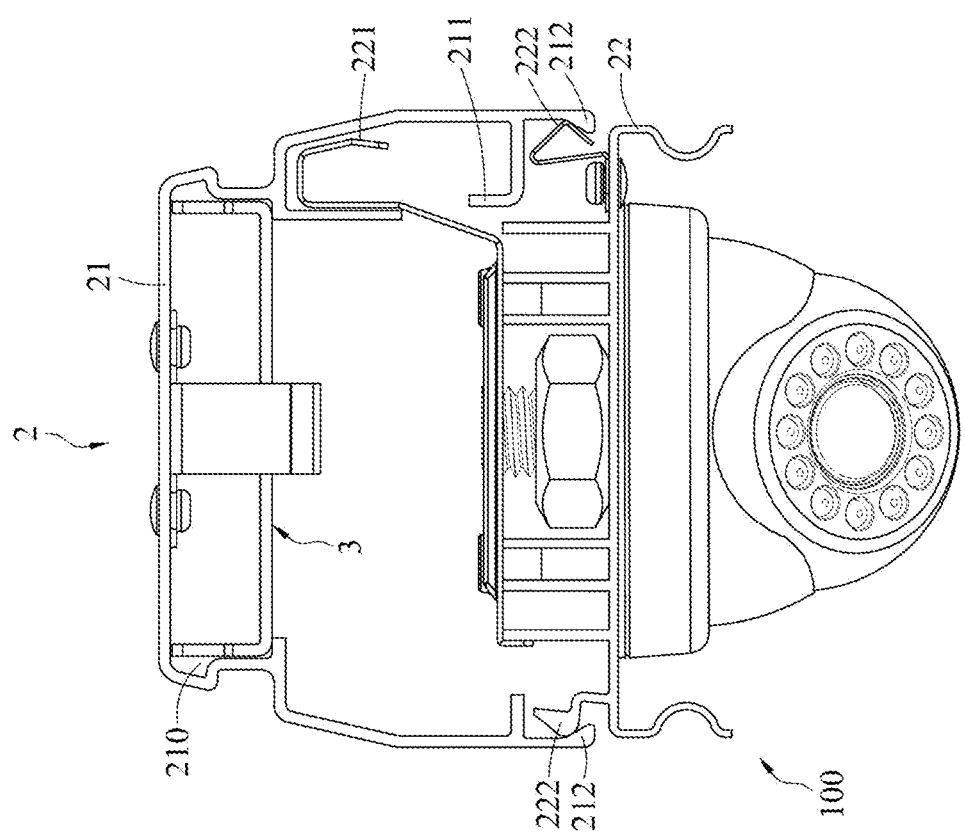
FIG. 7 is the third front sectional view of the linear lamp in accordance with one embodiment of the present invention, which shows that the state of the inwardly extended protrusion of the fixing housing is engaged with the outwardly extended protrusion of the functional base.

Please refer to FIG. 6 and FIG. 7. FIG. 6 is a second front sectional view, which shows the state that the inwardly extended protrusion 212 of the fixing housing 21 is not engaged with the outwardly extended protrusion 222 of the functional base 22. FIG. 7 is a third front sectional view, which shows that the state of the inwardly extended protrusion 212 of the fixing housing 21 is engaged with the outwardly extended protrusion 222 of the functional base 22. In some embodiments, the two sides of the fixing housing 21 are provided with two inwardly extended protrusions 212 respectively and the two sides of the functional base 22 are provided with two outwardly extended protrusions 222 respectively. Each of the outwardly extended protrusions 222 is detachably engaged with the inwardly extended protrusion 212 corresponding thereto. As described above, the functional base 22 can be fixed with the fixing housing 21 via the fixing structure, which is formed by several protrusions having different extending directions. Thus, the fixing housing 21 can generate two push forces toward the upper right direction and the upper left direction respectively so as to support the functional base 22. When the user needs to separate the functional base 22 from the fixing housing 21, the user needs to apply some force to release the fixing structure so as to disconnect the functional base 22 from the fixing housing 21.

Please refer to FIG. 8, which is a side view, which shows the state that the sensing module 292 of the extension module 2 turns on the camera 291 after detecting an object. In some embodiments, the extension module 2 can integrate several functional modules with each other in order to realize multiple functions instead of only one functional module having one function. Taking the combination of the sensing module 292 and the camera 291 as an example, when the sensing module 292 detects an approaching object (e.g., a person), the sensing module 292 transmits a sensing signal to the control chip on the circuit board and then the control chip turns on the camera 291 in order to capture the image of the object.

To sum up, according to the linear lamp having splicing member of the embodiments of the present invention, the functional extension of the linear lamp can be realized by linear splicing mechanism, such that various extension functions can be conveniently and efficiently added to the linear lamp regardless of the environment. In addition, the appearance of the fixing housing of the extension module can match that of the upper half of the linear lamp, so the overall appearance of the linear lamp will not be influenced. Further, via the connection structure of the lamp body, the spring sheets of the extension module and the installation holes of the splicing member, the user can conveniently and efficiently install or replace the extension module by using the pressing portions of the spring sheets. Moreover, via the design of the hanging hook of the functional base of the extension module and the arm hook, the user can conveniently install or replace the functional base by hanging the functional base on the hook arm of the fixing housing in order to avoid that the functional base falls from the fixing housing.

It will be apparent to those skilled in the art that various modifications and variations can be made to the disclosed embodiments. It is intended that the specification and examples be considered as exemplary only, with a true scope of the present invention being indicated by the following claims and their equivalents.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A linear lamp having a splicing member, comprising:
   a lamp body having a first combining member disposed at one side thereof, a lamp housing disposed at an upper part thereof and a lamp cover disposed at a lower part thereof, wherein the first combining member is disposed at an inner wall of the lamp housing;
   an extension module disposed on one side of the lamp body, wherein one side of the extension module is provided with a second combining member, wherein the extension module has a fixing housing disposed at an upper part thereof and corresponding to the lamp housing, and the second combining member is disposed on an inner wall of the fixing housing; and
   a splicing member having two fixing portions disposed at two ends thereof respectively, wherein the two fixing portions are engaged with the first combining member and the second combining member respectively in order to splice the extension module and the lamp body with each other;
   wherein the first combining member and the second combining member are spring sheets, and the fixing portions are installation holes, wherein the spring sheets are engaged with the installation holes respectively, wherein each of the spring sheets has a hook portion and a pressing portion disposed at a distal end of the hook portion, wherein the hook portion is detachably engaged with the installation hole corresponding thereto and the pressing portion is exposed from the splicing member.

2. The linear lamp having a splicing member as claimed in claim 1, wherein two ends of the splicing member are disposed inside the lamp housing and the fixing housing respectively.

3. The linear lamp having a splicing member as claimed in claim 2, wherein the lamp housing has a first position limiting slot and the fixing housing has a second position limiting slot, wherein the two ends of the splicing member are engaged with the first position limiting slot and the second position limiting slot respectively.

4. The linear lamp having a splicing member as claimed in claim 1, wherein the extension module has a functional base connected to the fixing housing and having a hanging hook, wherein the fixing housing has a hook arm and the hanging hook hangs on the hook arm.

5. The linear lamp having a splicing member as claimed in claim 4, wherein two sides of the fixing housing are provided with two inwardly extended protrusions respectively and two sides of the functional base are provided with two outwardly extended protrusions respectively, wherein each of the outwardly extended protrusions is detachably engaged with the inwardly extended protrusion corresponding thereto.

6. The linear lamp having a splicing member as claimed in claim 1, wherein the extension module comprises a camera and a sensing module.

\* \* \* \* \*